(12) United States Patent
Hoctor et al.

(10) Patent No.: US 7,385,705 B1
(45) Date of Patent: Jun. 10, 2008

(54) IMAGING SPECTROSCOPY BASED ON MULTIPLE PAN-CHROMATIC IMAGES OBTAINED FROM AN IMAGING SYSTEM WITH AN ADJUSTABLE POINT SPREAD FUNCTION

(75) Inventors: Ralph Thomas Hoctor, Saratoga Springs, NY (US); Frederick Wilson Wheeler, Jr., Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 215 days.

(21) Appl. No.: 11/445,224

(22) Filed: Jun. 2, 2006

Related U.S. Application Data

(60) Provisional application No. 60/686,921, filed on Jun. 3, 2005.

(51) Int. Cl.
*G01B 9/02* (2006.01)
(52) U.S. Cl. ..................................... 356/456
(58) Field of Classification Search ........ 356/451–456; 250/339.07, 339.08
See application file for complete search history.

(56) References Cited

U.S. PATENT DOCUMENTS

| | | | |
|---|---|---|---|
| 4,136,954 A * | 1/1979 | Jamieson | 356/456 |
| 4,856,884 A * | 8/1989 | Fender et al. | 359/419 |
| 5,905,591 A * | 5/1999 | Duncan et al. | 359/399 |
| 6,351,307 B1 * | 2/2002 | Erskine | 356/451 |
| 7,034,945 B2 * | 4/2006 | Kendrick et al. | 356/456 |
| 7,092,103 B1 * | 8/2006 | Kendrick et al. | 356/497 |

* cited by examiner

*Primary Examiner*—Hwa (Andrew) S Lee
(74) *Attorney, Agent, or Firm*—McDermott Will & Emery LLP

(57) ABSTRACT

Generating a multispectral or hyperspectral image of an image source with an optical system having an adjustable, wavenumber-dependent point spread function, by collecting panchromatic images of the image source, each of which corresponds to a selected point spread function and includes a measured intensity data set corresponding to a range of wavelengths, transforming the panchromatic images into the spatial frequency domain by using a Fourier transform, solving a matrix equation at each spatial frequency, in which a vector of the transformed panchromatic images is equal to the product of a predetermined matrix of discrete weighting coefficients and a vector representing a wavenumber content of the image source at each spatial frequency, resulting in a determined wavenumber content of the image source in the spatial frequency domain, and inverse transforming the determined wavenumber content of the image source from the spatial frequency domain into the image domain, resulting in the multispectral or hyperspectral image.

24 Claims, 10 Drawing Sheets

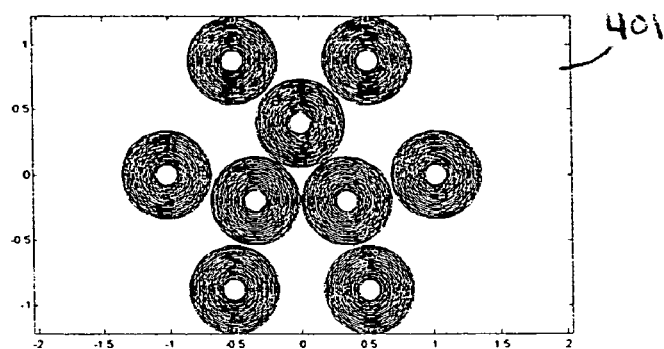
FIGURE 4A
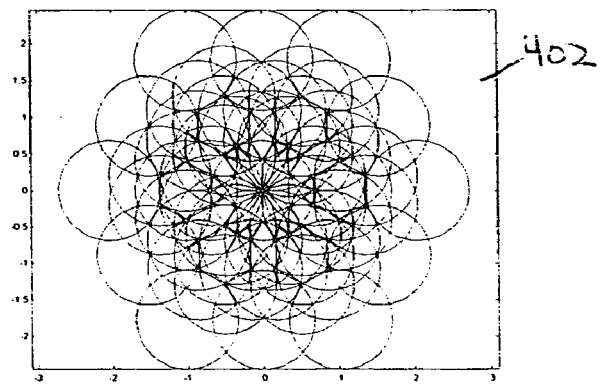
FIGURE 4B
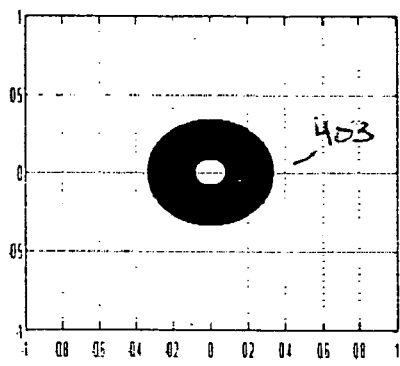
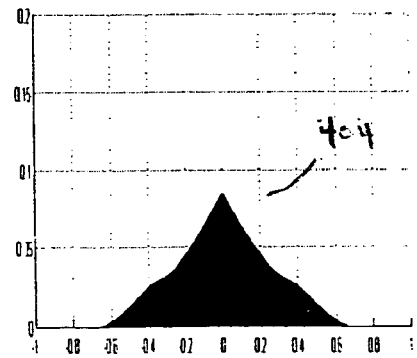
FIGURE 4C
FIGURE 4D

Index: (60,85)

Index: (118,90)

Index: (185,182)

Index: (190,192)

IMAGING SPECTROSCOPY BASED ON MULTIPLE PAN-CHROMATIC IMAGES OBTAINED FROM AN IMAGING SYSTEM WITH AN ADJUSTABLE POINT SPREAD FUNCTION

CROSS-REFERENCE TO RELATED APPLICATION

The present application claims the benefit of priority under 35 U.S.C. § 119 from U.S. Provisional Patent Application Ser. No. 60/686,921 entitled "ENHANCED IMAGING SPECTROSCOPY COMPUTED FROM MULTIPLE PAN-CHROMATIC IMAGES FORMED BY AN IMAGING SYSTEM WITH AN ADJUSTABLE POINT SPREAD FUNCTION," filed on Jun. 3, 2005, the disclosure of which is hereby incorporated by reference in its entirety for all purposes.

STATEMENT REGARDING FEDERALLY SPONSORED RESEARCH OR DEVELOPMENT

Not Applicable.

FIELD OF THE INVENTION

The present invention generally relates to imaging spectroscopy and, in particular, relates to imaging spectroscopy computed from multiple pan-chromatic images formed by an imaging system with an adjustable point spread function.

BACKGROUND OF THE INVENTION

In satellite imaging of the Earth's surface, it is often desirable to know the wavenumber (or wavelength) content of the reflected and emitted light, since this can indicate composition of the reflecting or emitting material. It is typical in such an application to restrict attention to optical and near IR regions of the spectrum, that is, to wavelengths in the range of about 400 nm to 2400 nm. When a moderate number of wavelength bins (ie. 5 to 20) are observed, this is called "multispectral imaging." When a large number of such bins (ie. 200) are observed, it is called "hyperspectral imaging." Hyperspectral imaging is characterized by an average wavenumber bin size of about 10 nm.

In one imaging spectroscopy approach, light from a single line in the image is split into component wavelengths by a prism or grating. Such an approach requires that each line of the image be acquired separately, and the signal-to-noise ratio (SNR) of each measured component will be worse than if the panchromatic image were recorded. Another imaging spectroscopy approach uses a piece of equipment called a Michelson interferometer and a computational technique known as Fourier Transform Imaging Spectroscopy (FTIS). In this approach, the light that would be measured to form an image is split, and the two versions are delayed with respect to each other over a range of delays, producing an amplitude-modulated panchromatic image for each delay. This has the effect of producing the sampled autocorrelation function of the light at each image location, and a point-by-point Fourier transform computation recovers the spectrum at each such location. In this approach, the mass of the interferometer reduces the total mass of other equipment that can reside on the orbital platform, some of the light is lost in the splitting operation of the interferometer, and some of the component panchromatic images can have very low SNR, which can affect the quality of the resulting hyperspectral image. In yet another approach, the effect of the interferometer is obtained by moving one portion of an optical array relative to another; this approach uses the same FTIS computation as is used with the Michelson interferometer. This approach has the advantage of eliminating the interferometer, but it limits the high spatial frequency content of the hyperspectral image to be less than that which could be obtained using the Michelson interferometer. This has the undesirable effect of removing some scene detail from the hyperspectral image.

It is desirable to provide an approach to imaging spectroscopy that does not use a Michelson interferometer or prism, thus saving payload mass, and yet reproduces any spatial frequencies passed by the optical imaging system in the reconstructed hyperspectral image.

SUMMARY OF THE INVENTION

The present invention generally relates to imaging spectroscopy and, in particular, relates to computational spectroscopy for generating a multispectral, or hyperspectral, image from multiple pan-chromatic images that are formed by an imaging system having an adjustable point spread function.

In one embodiment, the invention is directed to computer-executable process steps for generating a hyperspectral image of an image source using an optical system having an adjustable, wavenumber-dependent point spread function. The computer-executable process steps include collecting a plurality of panchromatic images of the image source from the optical system, each panchromatic image corresponding to a selected one of a predetermined set of point spread functions and being comprised of a measured intensity data set corresponding to a range of wavelengths, and then transforming the collected plurality of panchromatic images from an image domain into the spatial frequency domain by using a Fourier transform. The steps also include solving a matrix equation at each one of a predetermined set of spatial frequencies, in which a vector of the transformed panchromatic images at each spatial frequency is equal to the product of a predetermined matrix of discrete weighting coefficients and a vector representing a wavenumber content of the image source at each spatial frequency, resulting in a determined wavenumber content of the image source in the spatial frequency domain, and inverse transforming the determined wavenumber content of the image source from the spatial frequency domain into the image domain, resulting in the hyperspectral image of the image source.

In another embodiment, the invention concerns a computational imaging spectroscopy system that includes an optical system for collecting portions of a wavefront from an image source, the optical system having an adjustable, wavenumber-dependent point spread function, combiner optics for combining and interfering the collected portions of the wavefront on an image plane for collection by at least one panchromatic light intensity sensor and one or more processors. The system further includes a computer readable medium carrying one or more sequences of instructions for computationally generating a hyperspectral image of the image source, wherein execution of the one or more sequences of instructions by the one or more processors causes the one or more processors to perform the steps of collecting a plurality of panchromatic images of the image source from the optical system, each panchromatic image corresponding to a selected one of a predetermined set of point spread functions and being comprised of a measured intensity data set corresponding to a range of wavelengths, and then transforming the collected plurality of panchromatic images from an image domain into the spatial frequency domain by using a Fourier transform. The steps also include solving a matrix equation at each one of a predetermined set of spatial frequencies, in which a vector of the transformed panchromatic images at each spatial frequency is equal to the product of a predetermined matrix of discrete weighting coefficients and a vector representing a wavenumber content of the image source at each spatial frequency, resulting in a determined wavenumber content of the image source in the spatial frequency domain, and inverse transforming the determined wavenumber content of the image source from the spatial frequency domain into the image domain, resulting in the hyperspectral image of the image source.

In one embodiment of the invention, the optical system is an array of telescope subapertures, each telescope subaperture having an independently-adjustable optical path length, and the point spread function of the optical system is adjusted for each panchromatic image by adjusting the optical lengths of the array of telescope subapertures. In one embodiment, the measured range of wavelengths is from 400 nm to 2400 nm, and is comprised of a plurality of contiguous wavelength bands having an average spacing of 10 nm, and the measured intensity data set for each panchromatic image includes measured intensity data corresponding to each wavelength band.

In this manner, the present invention provides a computational imaging spectroscopy method and system for generating a multispectral, or hyperspectral, image from multiple pan-chromatic images that are formed by an imaging system having a wavenumber-dependent, adjustable point spread function.

The present invention thereby generates a high resolution multispectral, or hyperspectral, image without the need to employ extra hardware, such as a separate interferometer, and without the need to rely on filters, prisms or gratings to isolate component wavenumbers, while using high signal-to-noise ratio (SNR) component panchromatic images to avoid the introduction of noise in the resultant multispectral, or hyperspectral, image.

In the following description of the preferred embodiment, it is shown by way of illustration a specific embodiment in which the invention may be practiced. It is to be understood that other embodiments may be utilized and changes may be made without departing from the scope of the present invention.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

FIG. 4A depicts aperture geometry of a segmented aperture optical system according to another embodiment of the present invention;

FIG. 4B depicts coarray segments associated with the aperture geometry shown in FIG. 4A;

FIG. 4C depicts a single subaperture shape of the apertures shown in FIG. 4A;

FIG. 4D depicts the autocorrelation of the single subaperture shape shown in FIG. 4C;

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

As mentioned above, the present invention utilizes an optical system with multiple independently-adjustable subapertures, to produce an ensemble of panchromatic images, each of which is composed of energy from a range of wavelengths and is collected with a unique point spread function of the optical system based on the multiple independent subapertures being set at different optical path lengths. These images are captured digitally and Fourier transformed to the spatial frequency domain. For each spatial frequency in the sampled image, a matrix equation is solved that describes the observations as a weighting coefficient matrix times a vector representing the wavenumber content of the source at that spatial frequency, thereby solving for the source wavenumber content which is transformed to the image domain. The result is a hyperspectral image of the source, derived from an ensemble of panchromatic images.

Accordingly, the present invention takes advantage of the fact that a sparse aperture optical imaging system, whose aperture is composed of multiple subapertures can produce a range of very dissimilar point spread functions ("PSFs") by changing the relative distance of the subapertures to the image formation plane. The PSF of each panchromatic image formed by such a system is actually the integral of an ensemble of PSFs that vary with the wavenumber content of the pixels across the image plane. The independent use of all of the subapertures allows the estimation of wavenumber spectra at all the highest spatial frequencies passed by the optical system.

At a particular spatial frequency, a panchromatic image can be seen as the inner product of the wavenumber content of the source at that spatial frequency and the wavenumber-varying OTF at that frequency. For an ensemble of panchromatic images, assuming that the source distribution stays constant over the image formation time, the inner products of the wavenumber content of the source (unknown) and the various OTFs imposed by the imaging system (known) are observed. If there is enough diversity in these OTFs, the resulting set of equations for the wavenumber content of the source is solved at that spatial frequency. If this procedure is repeated for all spatial frequencies in the recorded image, a multispectral image of the source is obtained.

Figure 1:
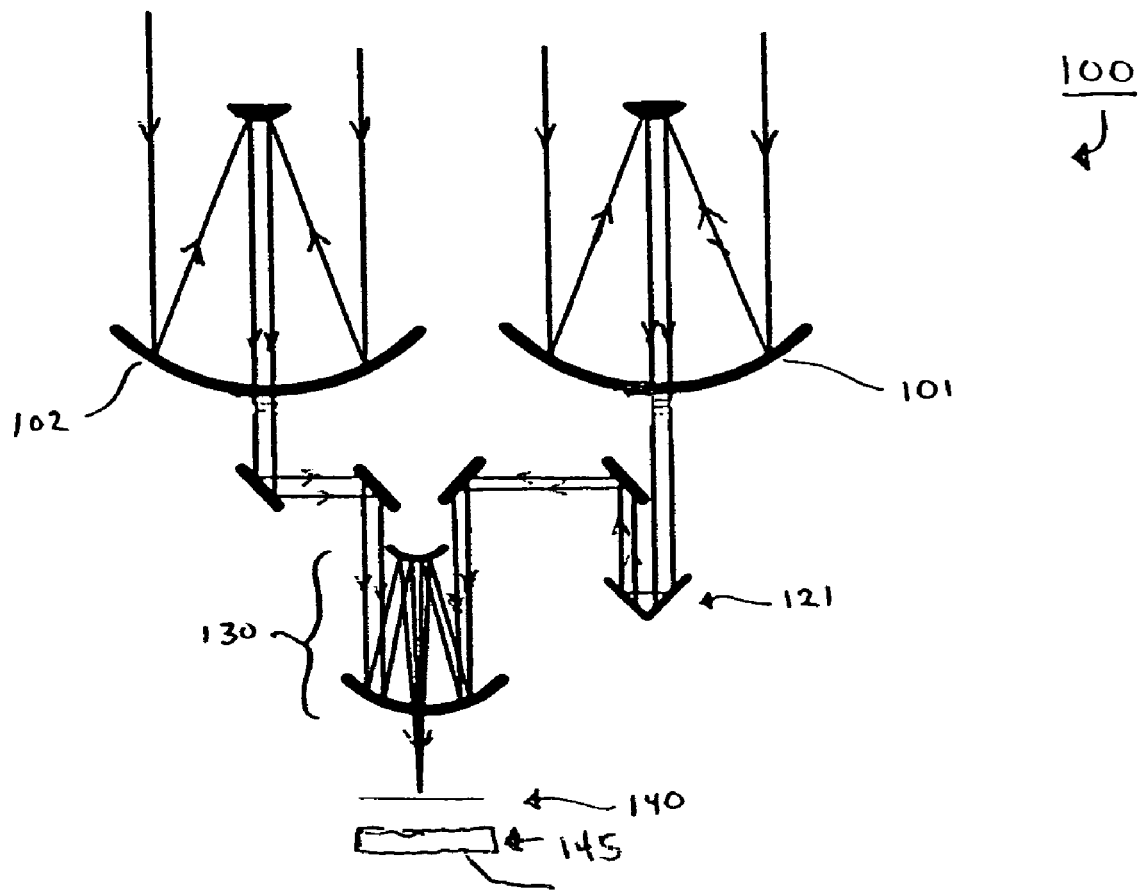
FIG. 1 is a basic diagram of a multi-aperture optical system according to one embodiment of the present invention.

FIG. 1 is a basic diagram for illustrating a basic segmented aperture optical system with which the present invention may be implemented. As seen in FIG. 1, optical system 100 is shown which includes subapertures 101 and 102 for collecting wavefront 150 from a distant image source (not shown). The collected wavefront from each of subapertures 101 and 102 is directed to combiner optics 130 through the use of mirrors. At least one of the subapertures, in this case subaperture 101, includes an independent path length adjustment device 121 for adjusting the optical path length of the incident radiation gathered by subaperture 101 to image plane 140. In this manner, the optical path lengths (D1 and D2) of subapertures 101 and 102 are at different distances, which is used to adjust the point spread function of optical system 100, as discussed in more detail below.

Combiner optics 130 of optical system 100 is a combination of lenses and mirrors, such as a combiner telescope, for combining the incident radiation collected by subapertures 101 and 102 at image plane 140 to generate a combined image. In this regard, at image sensor 145 is provided at the image plane to digitally record (collect) the combined wavefronts formed from the radiation collected by subapertures 101 and 102. Image sensor 145 is preferably comprised of at least one panchromatic light intensity sensor that can record image intensity data over a wide range of wavelengths, and at a high signal to noise ratio (SNR). The image plane is located at the focal distance of the optical imaging system, so that a Fourier transform of the incident wavefield is accomplished; this is a well known technique for forming the image of a far-field source. In one embodiment, image sensor 145 can record image intensity data over the wavelength range of 400 nm to 2400 nm, which includes the visible and near infrared ranges. The digitally recorded measured intensity data set for each panchromatic image is thereby collected and transferred to a processor for the computational imaging spectroscopy according to the invention, as discussed in more detail below.

Segmented aperture optical system 100 may include more than two subapertures, some or all of which have independently-adjustable optical lengths (to the image plane) in order to adjust the point spread function of the optical system. For example, the optical length of each of the subapertures can be independently adjusted to achieve a desired point spread function for optical system 100.

Figure 2:
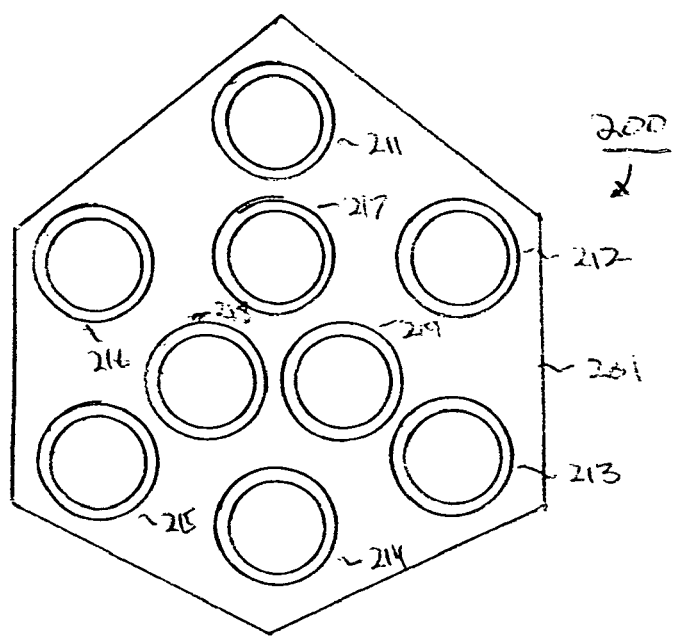
FIG. 2 depicts a multi-telescope array optical system of telescope subapertures according to one embodiment of the present invention.

In another embodiment, segmented aperture optical system 100 discussed above is a multi-telescope array of telescope subapertures which functions according to the same principles described above with respect to FIG. 1. Such a multi-telescope array optical system may be provided on a space-based platform for collecting images from space, such as of Earth. In this embodiment, each telescope subaperture has an independently-adjustable optical length (to the image plane). The independent adjustment of the optical lengths of all of the telescope subapertures is performed in order to adjust the point spread function of the optical system. FIG. 2 is a depiction of a multi-telescope array optical system 200 comprised of platform 201 which houses nine telescope subapertures 211 to 219, each of which has an independently-adjustable optical length.

In another embodiment, segmented aperture optical system 100 includes a controlled deformable segmented mirror, such as a MEMS mirror or other type of micro-machined mirror that can be deformed to control separate segments. In such a system, each controllable segment of the mirror operates as a subaperture having an independently-adjustable optical length (to the image plane). In this manner, the plurality of segments of such a mirror can be controlled to set their individual optical path lengths thereby adjusting the point spread function of the optical system. The optical system is configured so that the segmented mirror reflects the optical field prior to Fourier transformation into an image. In one embodiment, this is accomplished by forming an image of the incident field onto the mirror using a lens system in which the mirror is behind the focal plane of the lens. The reflection from this mirror is then passed through a separate lens system and the image is detected on the back focal plane of the second lens system.

Figure 3:
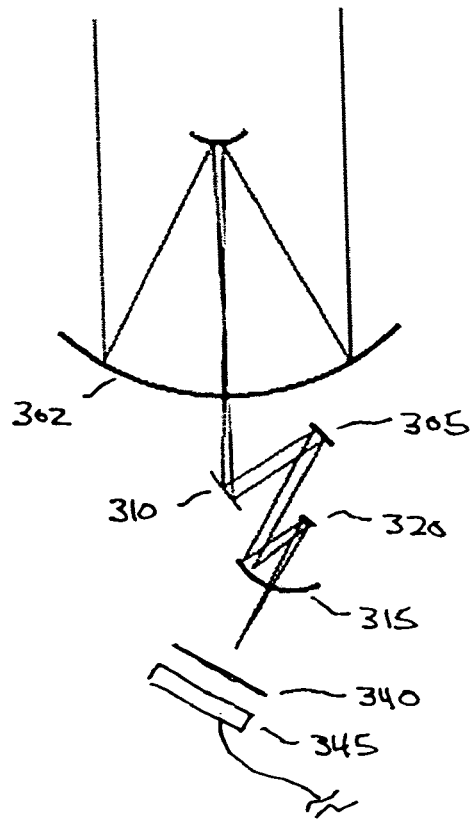
FIG. 3 depicts a controllable, deformable segmented mirror optical system according to another embodiment of the present invention.

FIG. 3 provides a depiction of an exemplary embodiment of optical system 300 in which one collecting element 302 is provided which collects radiation from an image source and forwards the collected wavefront via mirror 310 to controllable, deformable, segmented mirror 305 which is controlled by a processor (not shown) such as an on-board computer in the case of a space application. Mirror 305 is comprised of a plurality of controllable segments, which can be controlled by sending signals to mirror 305 to deform segments of its mirror face so as to control the shape of each segment. As seen in FIG. 3, the wavefront reflected from the plurality of controllable segments of mirror 305 is directed to mirrors 315 and 320, and then on to image plane 340, for digital recordation (collection) by image sensor 345. In this manner, each segment of mirror 305 acts as an independent subaperture and creates an individual pathlength of the wavefront, thereby adjusting the point spread function of optical system 300.

Whichever embodiment of segmented aperture optical system (telescope, segmented mirror, etc.) discussed above is utilized, the general principles for generating a multispectral, or hyperspectral, image from a set of collected panchromatic images will now be described more fully. In this regard, the present invention is directed to multispectral imaging of a reflecting/absorbing/emitting object which is illuminated by sunlight (or some other radiation), and uses the standard model of an incoherent imaging system and of a scalar wavefield. The source distribution is assumed to be in the far field of the aperture and the image plane is assumed to lie at the focal distance of the aperture optics, which is to be construed to possibly include any electrically controllable mirror. The observed intensity distribution on the image plane is digitized using a 2-D detector array (image sensor) that measures incident intensity and is responsive over the wavenumber band of interest.

Segmented aperture imaging systems allow a change of the imaging point spread function (PSF) from image to image by the adjustment of path lengths between the subapertures and the image formation plane. It should be noted that, even though incoherent imaging is assumed, the coherent combination of the wavefields from the various subapertures on the image plane is utilized to form the PSF. That is, all the optical path length differences between the subapertures must be less than the coherence interval of the wavefield. The recorded image is the intensity of this coherent combination of wavefields.

The PSF is the Fourier transform of the transmittance of the aperture. The narrowband aperture transmittance function of an N-aperture (N subapertures) system is denoted by the sum of the transmittances of the individual, spatially disjoint subapertures according to:

$$\Phi(u; k) = \sum_{n=1}^{N} \Phi_n(u; k) \tag{1}$$

where $$k = \frac{2\pi}{\lambda}$$

is the scalar wavenumber associated with the optical center frequency. The aperture transmittance function is parameterized by k, because it is implemented by imposing delays (longer path lengths) on the wavefield that vary by subaperture. A path length difference of $\Delta$ results in a phase difference of $\exp(jk\Delta)$, and if this is interpreted as imposing a phase-only weight on a subaperture, then it is seen that the weight varies with wavenumber. This type of array can be seen as the optical analog of the delay-and-sum beamformer used in passive, broadband acoustical imaging.

For a narrowband of wavelengths, the narrowband PSF is given by:

$$P(x; k) = \left| \int_A \Phi(u; k) e^{-\frac{jk}{z} u^T x} du \right|^2 \tag{2}$$

$$= \int_{CA} \left[ \int_A \Phi(u; k) \Phi^*(u - w; k) du \right] e^{-\frac{jk}{z} w^T x} dw$$

$$= \int_{CA} C(w; k) e^{-\frac{jk}{z} w^T x} dw$$

where x is a vector variable representing location on the image plane, u is a vector variable representing location on the aperture plane, $u^T x$ is an inner product of u and x, the symbol A is used as the limit of integration to represent integration over the aperture plane, the symbol CA represents integration over the coarray, defined below, and the quantity z represents the distance between the aperture plane and the image plane. The term optical Fourier transform is used herein when the complex exponential kernel of the transform contains the wavenumber and image plane distance as in Equation (2) above, and the term spatial Fourier transform is used when the complex exponential kernel of the transform does not contain the wavenumber and image plane distance. Equation (2) expresses the narrowband PSF as the optical Fourier transform of the autocorrelation, C(w; k), of the aperture transmittance function, which is also defined in Equation (2). This is a well-known result in optics. For the segmented aperture the autocorrelation function defined in Equation (2) can be expressed as:

$$C(w; k) = \sum_{n=1}^{N} \sum_{m=1}^{N} C_{n,m}(w; k) \tag{3}$$

where $C_{n,m}(w; k)$ is the cross-correlation of $\Phi_n(u; k)$ and $\Phi_m(u; k)$, given in Equation (1).

We can express $\tilde{P}(v; k)$, the inverse spatial Fourier transform of the PSF, in terms of C(w; k) using Equation (2) by according to:

$$\tilde{P}(v; k) = \int_{\infty} P(x; k) e^{j2\pi v^T x} dx = \tag{4}$$

$$\int_{CA} C(w; k) \left[ \int_{\infty} e^{-j2\pi(\frac{w}{\lambda z} - v)^T x} dx \right] dw = C(\lambda z v; k)$$

In Equation (4), the integral in brackets evaluates to a delta function. The function $C(\lambda z v; k)$ in Equation (4) is simply the unnormalized optical transfer function (OTF).

The coarray is defined as the support in the w-plane of the autocorrelation function C(w; k); the support of this function does not vary with k, but its value does, in general. Integration over the coarray is denoted by the limit of integration CA in Equations (2) and (4). The variable w is referred to herein as a lag, and the support regions of the subaperture correlations, $C_{n,m}(w; k)$, are referred to herein as coarray segments. Each coarray segment is centered at a location on the coarray plane that is the vector location difference between the area centroids of the correlated subapertures; this location is referred to herein as the lag of that segment. For exemplary purposes, the aperture geometry 401 depicted in FIG. 4A is considered, which is composed of N=9 annular segments. The coarray segments 402 associated with this aperture are depicted in FIG. 4B. Each circle in FIG. 4B is of radius 2R, where R is the outer radius of the annular subapertures depicted in FIG. 4A, and there are $$\frac{N(N-1)}{2} + 1 = 37$$

of them. FIGS. 4C and 4D depict a single subaperture shape 403 and its autocorrelation 404 (assuming no apodization). The aperture shape is shown in FIG. 4C, and the silhouette of the autocorrelation is shown in FIG. 4D. The autocorrelation is rotationally symmetric, and the peak value is proportional to the area of the aperture.

The intensity image due to a monochromatic wavefield with wavenumber k is given by the convolution of the PSF at k with S(x, k), the narrowband intensity source distribution, which is a function both of location on the source plane and wavenumber. Expressing this convolution in the Fourier transform domain and by using Equation (4) results in:

$$I(x; k) = \int_{CA_{\lambda z}} C(\lambda z v; k) \tilde{S}(v, k) e^{-j2\pi v^T x} dv \tag{5}$$

where $\tilde{s}(v; k)$ is the inverse spatial Fourier transform of the image source, $\tilde{s}(x, k)$, and the limit of integration $CA_{\lambda z}$ represents integration over the image of the coarray in the spatial frequency domain under the mapping $\nu=w/z$. In the spatial frequency domain, $CA_{\lambda z}$ is the support of the inverse spatial transform of the narrowband PSF at wavelength $\lambda$.

Equation (5) provides the basis for the present invention in which an ensemble of panchromatic images is measured and used to computationally arrive at a hyperspectral estimate of the source image. Each observed panchromatic image is modeled as the integral over the optical passband (visible and near-IR) in wavenumber of the monochromatic image defined by Equation (5), as follows:

$$I(x) = \int_K I(x;k)\,dk \tag{6}$$

It is assumed here that the response of the imaging system is uniform over its passband in the wavenumber domain, which we denote by K; however, it would also be easy to account for a wavenumber-dependent sensitivity in the system. The spatial Fourier transform of Equation (6) is denoted by:

$$\tilde{I}(\nu) = \int_\infty \int_K I(x;k)e^{j2\pi x^T \nu}\,dk\,dx \tag{7}$$

Substituting Equation (5) into Equation (7) results in:

$$\tilde{I}(\nu) = \int_K \int \int_{CA_{\lambda z}} C(\lambda z\omega;k)\tilde{S}(\omega,k)e^{-j2\pi\omega^T x}d\omega e^{j2\pi\nu^T x}dx\,dk \tag{8}$$

$$= \int_K \int_{CA_{\lambda z}} C(\lambda z\omega;k)\tilde{S}(\omega,k)\left[\int e^{-j2\pi(\omega-\nu)^T x}dx\right]d\omega\,dk$$

$$= \int_K C(\lambda z\nu;k)\tilde{S}(\nu,k)\,dk$$

For a fixed spatial frequency, $\nu$, this expression is an inner product in the wavenumber dimension, over the optical passband of the system, between the actual wavenumber content of the source at a certain spatial frequency and a weighting function imposed by the aperture. The wavenumber weighting function at spatial frequency $\nu$ is denoted as:

$$W(k;\nu) = C(\lambda z\nu;k) = \sum_{n=1}^N \sum_{m=1}^N C_{n,m}\left(\frac{2\pi z\nu}{k};k\right) \tag{9}$$

where $\lambda$ is written as $$\frac{2\pi}{k}.$$

Note that, for a non-trivial segmented aperture, not all the coarray segments at a given wavenumber will include the spatial frequency $\nu$ (see FIGS. 4A-D). In general, many coarray segments will not include that frequency for any wavenumber, so the weighting function of Equation (9) will typically only be influenced by some subset of the subaperture correlations in the double sum.

Equation (8) indicates that for a given spatial frequency in a recorded image, the value of the inner product of the wavenumber content with a known weighting function, determined by the subaperture transmittances, can be observed. If the subaperture transmittances are controllable at the time of image formation, the formation of multiple such weighting functions can be considered and it can be attempted to solve the resulting system of linear equations for the wavenumber content. In particular, for L observed images, the equations:

$$I_q(\nu) = \int_K W_q(k;\nu)\tilde{S}(\nu,k)dk, \text{ for } q=1,\ldots,L \tag{10}$$

can be solved for $\tilde{S}(\nu,k)$. This is true even if $\{W_q\}$ is not an orthogonal set of vectors or even a basis, in which case this set of equations could be "solved" in the least squares sense for the projection of $\tilde{s}(\nu,k)$ onto the space spanned by $\{W_q\}$. This is the approach taken in the computed spectroscopy of the present invention, and the dimension of this space is important to the performance of the method.

If the only adjustment allowed is the optical path length to the image plane, then each subaperture transmittance function in Equation (1) will be of the form:

$$\Phi_n(u;k) = e^{jkD_n}\alpha(u-u_n) \tag{11}$$

where $D_n$ is the path length deviation from some nominal value, $u_n$ is the location of the subaperture on the aperture plane and $\alpha(u)$ is a function centered at the origin describing the common transmittance of all the subapertures. It is assumed that all the subapertures have the same size, shape and apodization, although the analysis could easily be carried out for more general assumptions. The subaperture cross-correlation functions associated with Equation (11) are:

$$C_{n,m}(u;k) = e^{jk(D_n-D_m)}\int_A \alpha(w-u_n)\alpha^*(W-u_m-u)\,dw \tag{12}$$

$$= e^{jk(D_n-D_m)}X(u-(u_n-u_m))$$

where $X(w)$ is the autocorrelation of $\alpha(u)$, which is located at lag zero, and $(u_n-u_m)$ is the lag at which $C_{n,m}(w;k)$ is located. In particular, if the subapertures are uniformly apodized annuli, then the $\alpha(u)$ functions are like that depicted in FIG. 4C, and the corresponding $X(w)$ functions are like that depicted in FIG. 4D.

In order to obtain a set of specific simultaneous equations of the form given by Equation (10), L distinct panchromatic images are collected, each with a different set of subaperture settings. For the segmented aperture, the $q^{th}$ weight function is associated with a set of selected path lengths $\{D_n^{(q)}$ for $n=1,\ldots,N\}$, and the weight function at spatial frequency $\nu$ is given by:

$$W_q(k;\nu) = \sum_{n=1}^N \sum_{m=1}^N e^{jk(D_n^{(q)}-D_m^{(q)})}X\left(\frac{2\pi z\nu}{k}-(u_n-u_m)\right) \tag{13}$$

Note that each term of the weight function sum is composed of an amplitude weight modulated by a segment of a complex exponential with frequency $(D_n^{(q)}-D_m^{(q)})$.

In order to solve the equations given by Equation (10) numerically, to obtain the wavenumber content of the image source, the equations must be discretized both in spatial frequency and in wavenumber. In general, this change of representation will incur some discretization error, but for the special case of bandlimited wavenumber content, a condition guaranteed by the bandlimited response of the optical system, the sampling theorem will allow an exact representation in the two spatial dimensions. In spatial frequency, the images are bandlimited by virtue of the fact that the optical system passes only those spatial frequencies allowed by the aperture (for a given wavenumber). In the wavenumber dimension, the required sample rate depends on the variation of the $\{W_q(k; v)\}$ with respect to k.

The discretized version of the problem is obtained by using a two-dimensional DFT for the spatial Fourier transform in Equation (7). The DFT is applied to a sampled version of the intensity image, such as would be obtained from an array of detectors on the image plane if the sensor size were small compared to the PSF. For the qth data image, the DFT is given by:

$$\breve{I}_q(n) = \frac{1}{M^2} \sum_{m_1=0}^{M-1} \sum_{m_2=0}^{M-1} \int_K I_q(m_1\Delta x, m_2\Delta x; k)\,dk\, e^{j\frac{2\pi}{M}m^T n} \quad (14)$$

where $n=(n_1,n_2)$ and $m=(m_1,m_2)$ are index vectors with integer components and $\Delta x$ is the distance between adjacent samples in both coordinate directions on the image plane. The DFT coefficients $\breve{I}_q(n)$ may be approximately related to the Fourier transform $\tilde{I}_q(v)$ given in Equation (7) by writing a simple quadrature rule for the 2-D Fourier integral in Equation (7) and expressing the result in terms of Equation (14) as follows:

$$\breve{I}_q(n) \cong \frac{\Delta x^2}{M^2} \tilde{I}_q\left(\frac{n}{M\Delta x}\right) \quad (15)$$

Using Equation (15), Equation (10) may be rewritten as:

$$\frac{M^2}{\Delta x^2} \breve{I}_q(n) = \int_K W_q\left(k; \frac{n}{M\Delta x}\right) \tilde{S}\left(\frac{n}{M\Delta x}, k\right) dk, \text{ for } q=1,\ldots,L \quad (16)$$

Note that the integrand of Equation (16) is a point-by-point product between a DFT and a discrete mask function in the discrete spatial frequency domain. Such an operation implements a circular convolution between the mask and the DFT. In this case, the transform of the mask with respect to the spatial frequency variable is a sampled version of the PSF. This circular convolution is a good approximation for the linear convolution of the optical system in case the PSF is "small". In the context of the computation being described, this inaccuracy in the model may result in ringing around the spatial edges of the reconstructed multispectral image. This ringing will increase with increasing PSF size. In the frequency domain, this ringing appears as a bias added to spatial frequencies near the coordinate axes, and it can be suppressed during processing. The suppression can be implemented as mean subtraction across a pre-determined range of spatial frequencies, and it introduces a slight error at frequencies not associated with the edge effect.

To complete the computation, Equation (16) must be discretized in k, yielding:

$$\frac{M^2}{\Delta x^2} \breve{I}_q(n) = \sum_{p=0}^{P} W_q\left(p\Delta k + k_0; \frac{n}{M\Delta x}\right) \int_{K_p} \tilde{S}\left(\frac{n}{M\Delta x}, k\right) dk \quad (17)$$

where $\Delta k$ is the sample interval in the wavenumber domain, $k_0$ is the lowest wavenumber in the integration interval K, $P\Delta k+k_0$ is the greatest wavenumber in K and $K_p$ is the $p^{th}$ wavenumber bin, centered at $k=p\Delta k+k_0$. $\Delta k$ must be small enough so that the $\{W_q\}$ are all approximately constant over any interval of length $\Delta k$, and they can be removed from the integral as in Equation (17). This defines a required sample rate in terms of the variation of the wavenumber weight vectors. For an application that imposes a desired sample rate (like hyperspectral imaging), the $\{W_q\}$ should be synthesized so as to satisfy the constant-value constraint for the desired sample rate. The synthesis is performed by choosing the right path lengths, $\{D_n^{(q)}$ for $n=1,\ldots,N\}$.

When all L such inner products are combined into a matrix expression for the $n^{th}$ DFT coefficient, the result is:

$$\breve{I}_n = W_n \tilde{S}_n \quad (18)$$

where $\breve{I}_n$ is an L-component vector whose $q^{th}$ component is $$[\breve{I}_n]_q = \frac{M^2}{\Delta x^2} \breve{I}_q(n),$$

and $W_n$ is a P-by-L matrix whose $(p,q)^{th}$ element is $$[W_n]_{p,q} = W_q\left(p\Delta k + k_0; \frac{n}{M\Delta x}\right),$$

$\tilde{S}_n$ is a P-component vector whose $p^{th}$ component is $$[\tilde{S}_n]_p = \int_{K_p} \tilde{S}\left(\frac{n}{M\Delta x}, k\right) dk.$$

In general, the matrix $W_n$ is neither square nor of full rank. However, using Equation (18) the value of $\tilde{s}_n$ can be estimated in the least-squares sense using the pseudo-inverse:

$$\hat{\tilde{S}}_n = W_n^\# \breve{I}_n \quad (19)$$

and $w_n^\#$, can be computed using the singular value decomposition of $w_n$, so that:

$$\hat{\tilde{S}}_n = \sum_{i=1}^{R} \frac{\left(u_{n,i}^H \breve{I}_n\right)}{s_{n,i}} v_{n,i} \quad (20)$$

where $s_{n,i}$ is the $i^{th}$ largest singular value of $W_n$, $u_{n,i}$ is the $i^{th}$ right singular vector, $v_{n,i}$ is the $i^{th}$ left singular vector and R is the number of singular values used in the computation. The singular value decomposition (SVD) required to produce these data may be computed by the well-known Golub-Reinsch algorithm. It should be noted that the matrix $w_n$ is always known prior to image data collection, and so the singular value decomposition can be computed beforehand and the singular vectors and singular values stored until they are needed to compute Equation (20). The value of R is important in this computation, and it is not determined by the SVD; it is usually estimated from the SVD data and it can be less than the algebraic rank of $W_n$.

Note that Equation (18) can also be solved using various iterative numerical techniques. For example, any known minimization approach, such as the method of Rosenbrock, can be applied to the minimization of $|\check{I}_n - W_n \check{S}_n|^2$ with respect to $\check{S}_n$.

The final step in the computation is to perform an inverse spatial DFT to the image domain on each wavenumber plane of the data cube constructed by aggregating the estimates of Equation (19). This done, the estimate of the three-dimensional multispectral source is given by:

$$\hat{S} = IDFT_n[\hat{S}_n] \quad (21)$$

which is an M-by-M-by-L data cube in the image domain. In this manner, the estimate of the hyperspectral image is achieved computationally from an ensemble of collected panchromatic images, each panchromatic image being collected with the optical system adjusted to a different point spread function, in accordance with selected optical path lengths of the subapertures of the optical system.

As mentioned above, the ringing effect at spatial frequencies near the coordinate axes can be suppressed during processing by implementing a mean subtraction across a pre-determined range of spatial frequencies by replacing $\check{I}_n$ with $(\check{I}_n - \text{mean}(\check{I}_n))$ in Equation (18).

Figure 5:
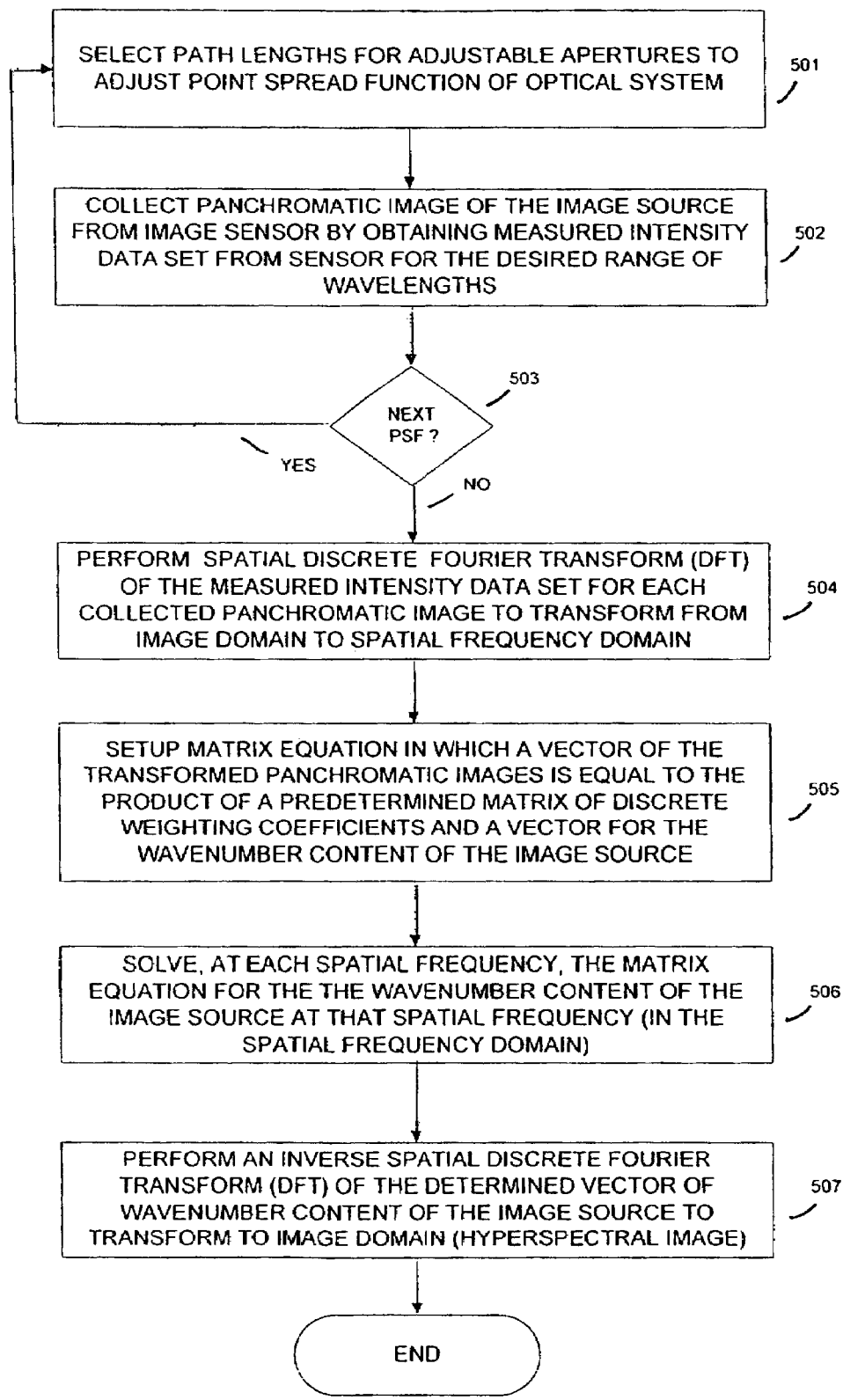
FIG. 5 is a flowchart for explaining the generation of a multispectral image according to one embodiment of the present invention.

FIG. 5 is a flowchart for illustrating an exemplary embodiment of the invention to computationally generate a hyperspectral image from an ensemble of collected panchromatic images. In step 501, the process starts by selecting desired optical path lengths for the subapertures of the optical system in order to adjust the point spread function (PSF) of the optical system to a desired PSF. The selected optical path lengths are from a predetermined set of optical path lengths. Once the subapertures of the optical system are set to the selected optical path lengths, a panchromatic image of the image source is collected from the image sensor of the optical system by obtaining a measured intensity data set from the sensor for a desired range of wavelengths (step 502). Preferably, the range of wavelengths for which intensity data is measured is comprised of a plurality of contiguous narrow wavelength bands, such as wavelength bands of 10 nm each over the entire wavelength range of 400 nm to 2400 nm.

In step 503, it is determined if there is another point spread function (PSF) for which a panchromatic image should be collected. This can be determined based on whether there are remaining optical path lengths left in the predetermined set of optical path lengths for which panchromatic images have not yet been collected. If the determination in step 503 is yes, then steps 501 and 502 are repeated to set the subapertures at new optical path lengths and collect another panchromatic image. If the determination in step 503 is no, then the process proceeds to step 504 in which a spatial discrete Fourier transform (DFT) is performed on each measured intensity data set for each collected panchromatic image, thereby transforming the measured intensity data set for each collected panchromatic image from the image domain to the spatial frequency domain.

Next, in step 505, a matrix equation is set up in which a vector of the transformed panchromatic image data is equal to the product of a predetermined matrix of weighting coefficients and a vector representing the wavenumber content of the image source, the latter vector being the vector to be solved. The matrix equation in one embodiment of the invention is set forth in Equation (18) above. The matrix equation is then solved, at each spatial frequency in the measured panchromatic image, in step 506 to determine the wave wavenumber content of the image source at that spatial frequency in the image domain. The solution to the matrix equation in one embodiment of the invention is set forth in Equations (19) and (20) above.

After solving for the wave wavenumber content of the image source at each spatial frequency, (vector of wavenumber content of the image source), the determined vector of wavenumber content of the image source is inverse spatial discrete Fourier transformed (DFT) in step 507 to transform the determined image wavenumber data from the spatial frequency domain into the image domain, thereby resulting in the high resolution hyperspectral image of the source. The inverse spatial discrete Fourier transformed (DFT) of step 507 in one embodiment of the invention is set forth in Equation (21) above. In this manner, the present invention computationally determines the wavenumber content of an image source across a desired range of wavenumbers from a series of measured panchromatic images and predetermined weight coefficients.

In another embodiment of the invention, a different computational approach can be used to determine the wavenumber content of an image source from the series of measured panchromatic images. In this regard, the problem of computational artifacts at low spatial frequencies can be reduced and the restriction on the smoothness of the induced weight functions can be relaxed by using a moment discretization for wavenumber discretization, based on the observation that the computed estimate of $\hat{s}(v, k)$ will always be a linear combination of the $\{c_q\}$ as follows:

$$\hat{\tilde{S}}_n(v, k) = \sum_{q=1}^{L} b_q(v) C_q(\lambda z v; k) \quad (22)$$

and the estimation problem is equivalent to finding the $\{b_q\}$. The set of equations of (10) can be written in the form of a vector equality for the $n^{th}$ DFT coefficient as set forth below:

$$\Phi_n = \begin{bmatrix} \tilde{I}_1(n) \\ \vdots \\ \tilde{I}_L(n) \end{bmatrix} = \begin{bmatrix} \int_K C_1(\lambda z v(n); k) \tilde{S}(v(n), k) dk \\ \int_K C_L(\lambda z v(n); k) \tilde{S}(v(n), k) dk \end{bmatrix} \quad (23)$$

where $v(n)$ is the analog spatial frequency associated with the $n^{th}$ DFT coefficient. This can be written as a matrix equation by substitution of the estimate in the form of (22) for the quantity $\hat{s}(v(n), k)$ in (23) as follows:

$$\Phi_n = \begin{bmatrix} \sum_{q=1}^{L} b_q c_{1,q} \\ \vdots \\ \sum_{q=1}^{L} b_q c_{L,q} \end{bmatrix} = \begin{bmatrix} c_{1,1} & \cdots & c_{1,L} \\ \vdots & \ddots & \vdots \\ c_{L,1} & \cdots & c_{L,L} \end{bmatrix} \begin{bmatrix} b_1 \\ \vdots \\ b_L \end{bmatrix} \quad (24)$$

where we have suppressed the dependence of all the various terms on the righthand side in (24) on spatial frequency and have defined the inner products of the weight vectors as:

$$c_{n,m} = \int_K C_n(\lambda z v(n); k) C_m(\lambda z v(n); k) dk \quad (25)$$

Equation (24) can be denoted as:

$$\Phi_n = Cb \quad (26)$$

The matrix C need not be of full rank. In general, if the $\{c_q\}$ span a space of dimension X, then C will have rank X. In this case, a pseudoinverse can be computed from the SVD that will allow us to express the least-squares solution to (23) in the form of (22).

The main advantage of moment discretization is that it requires no assumptions about the weight functions. As long as the numerical integration used to compute the integrals of (25) is accurate, no assumptions are required.

A discrete wavenumber spectrum estimate in the form of integrals over a partition of the wavenumber domain:

$$\tilde{S}_p = \int_{K_p} \tilde{S}(v(n), k) dk \quad (27)$$

can be computed from (22) by numerical integration over the set of bands $\{K_1, \ldots, K_p\}$ forming the partition.

The self-correlation terms in Equation (13) cause a bias in the computation for low spatial frequencies. The terms in Equation (3) for which m=n have a modulating frequency of zero. These terms are associated with correlation segments that are centered at the origin, and they contribute the same information to every component image. This is referred to as the uncontrollable part of the weight, and the part of the weight associated with correlation segments centered at higher lags is referred to as the controllable part of the weight. The fact that the uncontrollable part is the same in every observation adds a bias that can make the operation of Equation (19) less well conditioned, and so must be addressed in the computation.

The foregoing discretization can be used to implement bias compensation. The zero-lag coarray segment Equation (8) above can be rewritten as:

$$\tilde{I}_q(v) = \int_K (C_q(\lambda z v; k) + B(\lambda z v; k)) \tilde{S}(v, k) dk \quad (28)$$

where the $\{C_q\}$ notation is used for the controllable part of the weight and a second term is added to represent the bias. This holds everywhere on the coarray plane with the understanding that the bias is zero outside the zero-lag coarray segment. If Equation (28) is substituted into Equation (23), and the result is used to re-write Equation (24), the following is obtained:

$$\Phi_n = Cb + \left( [c_{B,1} \cdots c_{B,L}] \begin{bmatrix} b_1 \\ \vdots \\ b_L \end{bmatrix} \begin{bmatrix} 1 \\ \vdots \\ 1 \end{bmatrix} \right) \quad (29)$$

with the definition of:

$$c_{B,q} = \int_K B(\lambda z v; k) C_q(\lambda z v; k) dk \quad (30)$$

Denoting the row vector in (29) by $c_B^T$ results in $\Phi_n = Cb + (c_B^T b)1$.

If both sides are multiplied by the pseudoinverse of C and it is recognized that the inner product is a scalar, the result is:

$$C^+ \Phi_n = b + C^+ 1 c_B^T b = (I + C^+ 1 c_B^T) b \quad (31)$$

where we note that the term in parenthesis is a rank-one update to the identity matrix. If we apply the partitioned matrix inversion lemma, the result is:

$$b = \left( I - \frac{C^+ 1 c_B^T}{1 + c_B^T C^+ 1} \right) C^+ \Phi_n \quad (32)$$

assuming that $C_B^T C^+ 1 \neq -1$, which could be part of the design criteria for the $\{C_q\}$. This computation applies for all DFT frequencies, with the understanding that $c_B = 0$ outside the zero-lag coarray segment. In this manner, b is solved with a bias compensation, and, as described above, b can then used to solve for the computed estimate of the wavenumber content of the image source, as in Equation (22).

Figure 6:
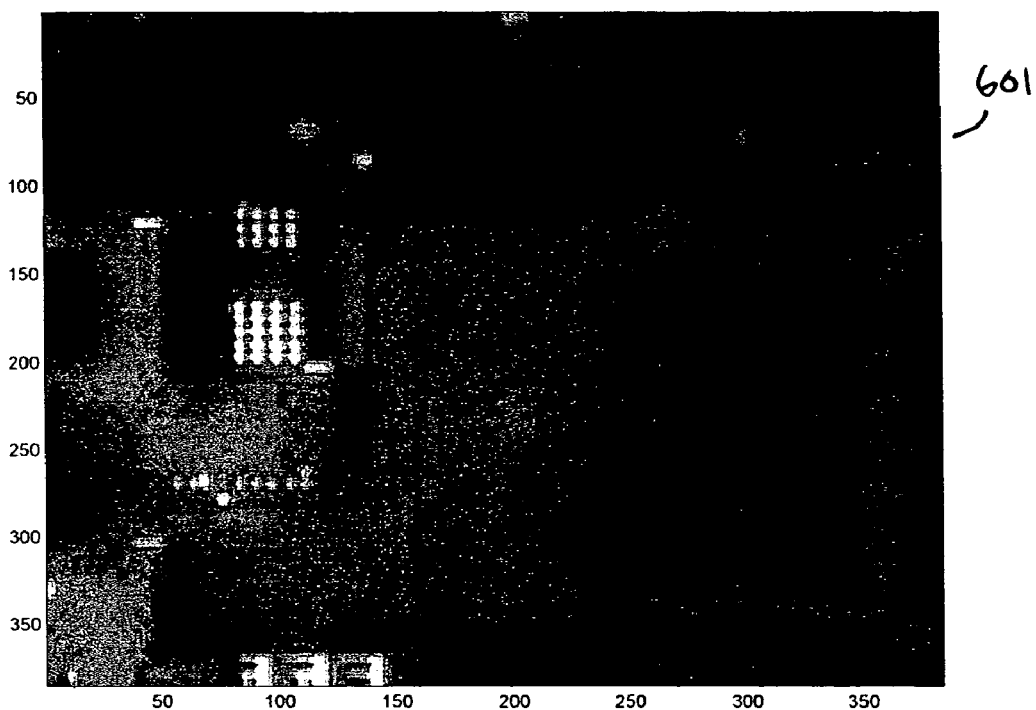
FIG. 6 is a graphic depiction of a measured intensity data set for a panchromatic image using nine subapertures according to one embodiment of the present invention.
Figure 7:
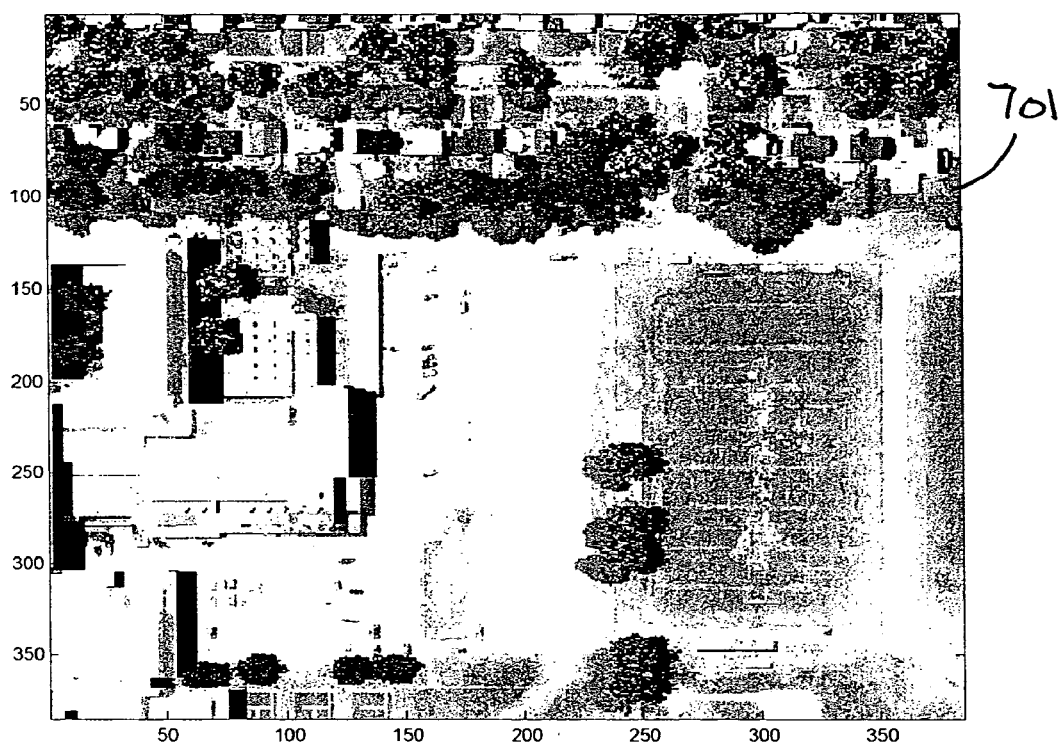
FIG. 7 is a graphic depiction of a true image of an image source according to one embodiment of the present invention.
Figure 8:
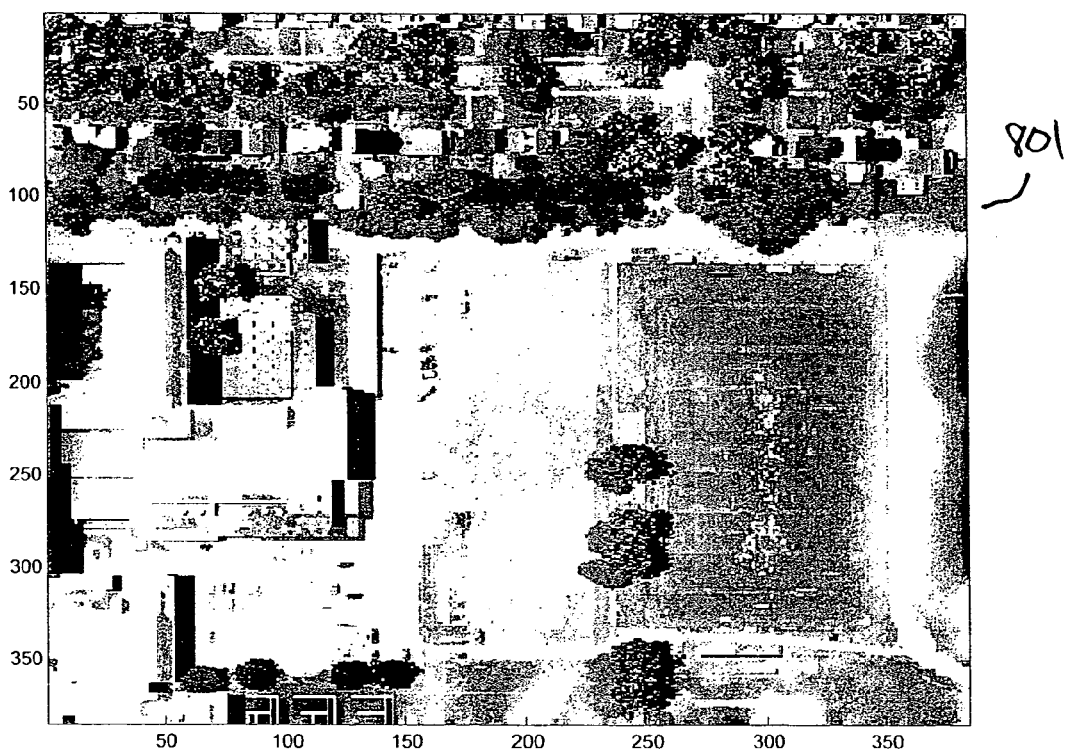
FIG. 8 is a graphic depiction of a reconstructed multispectral image of the image source shown in FIG. 7, according to one embodiment of the present invention.

Some exemplary results of the present invention are now discussed. FIG. 6 is a graphic depiction of a measured intensity data set 601 for a single collected panchromatic image over the visible spectrum at a particular point spread function. As seen in FIG. 6, the features of panchromatic image 601 are blurry. FIGS. 7 to 9 are related to a simulation using an exemplary embodiment of the computational spectroscopy method of the present invention in which the optical system is comprised of 9 subapertures and 24 wavenumber bins over the visible spectrum (400 nm to 667 nm in wavelength) of the hyperspectral image are estimated by using 100 collected panchromatic images. In FIG. 7, a true image of an image source 701 is shown, which is the image source used as the image source for the simulation. FIG. 8 depicts the estimated hyperspectral image data set 801 which has been reconstructed from 100 collected panchromatic images according to an exemplary embodiment of the present invention. As can be seen in FIG. 8, there is some bias in the reconstructed image data, which appears as bright, washed-out regions in estimated hyperspectral image data set 801.

Figure 9A:
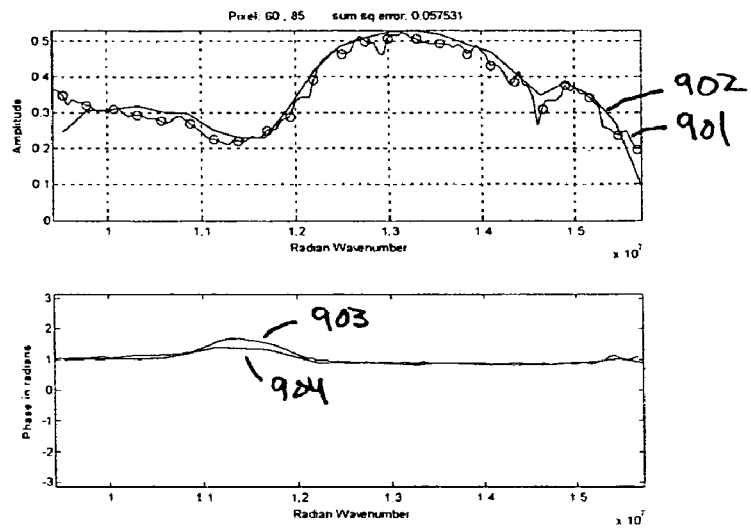
FIGS. 9A to 9D are graphs for illustrating the spectral accuracy in the spatial frequency domain of a reconstructed multispectral image according to one embodiment of the present invention.
Figure 9B:
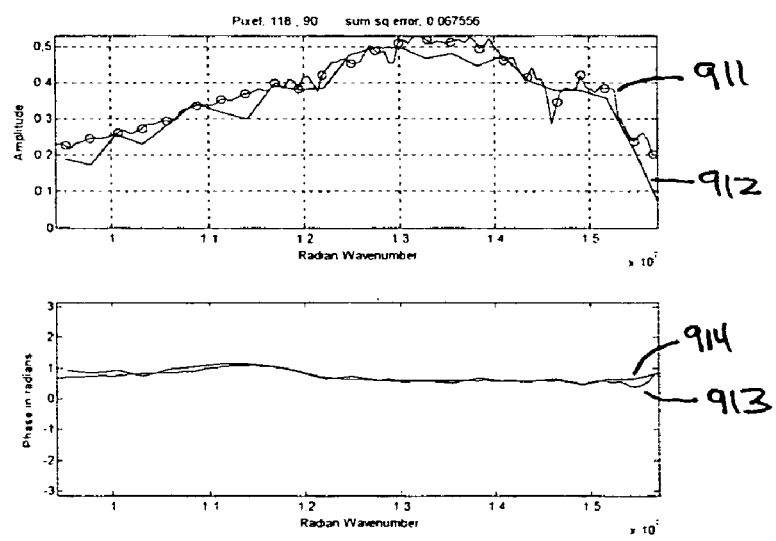

FIGS. 9A to 9D are graphs depicting the spectral accuracy in the spatial frequency domain at four different points in spatial frequency domain of reconstructed hyperspectral image 801, where the spatial frequency origin is at the index of 193, 193. As seen in FIG. 9A for index location (60,85), the estimated intensity amplitude 901 tracks well with the true intensity 902 amplitude over the wavenumber range, and the estimated phase 903 also tracks well with the true phase 904 over the wavenumber range. In FIG. 9B for index location (118,90), the estimated intensity amplitude 911 tracks reasonably well with the true intensity amplitude 912 over the wavenumber range, and the estimated phase 913 also tracks well with the true phase 914 over the wavenumber range.

Figure 9C:
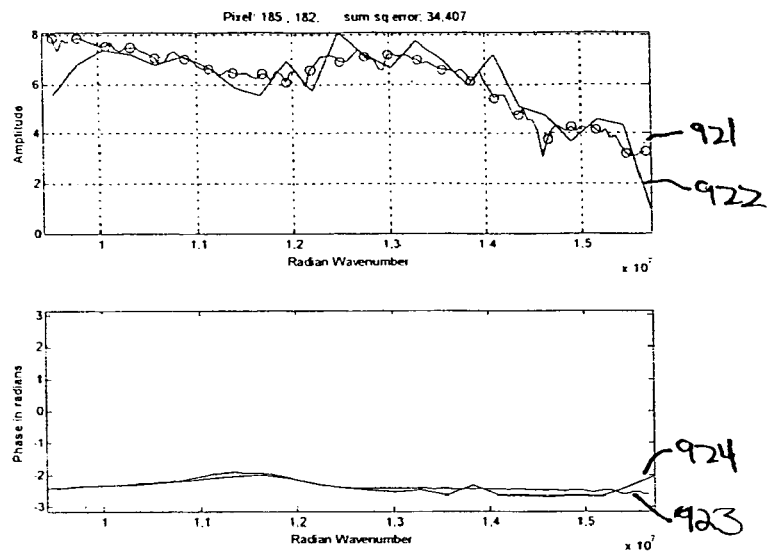
Figure 9D:
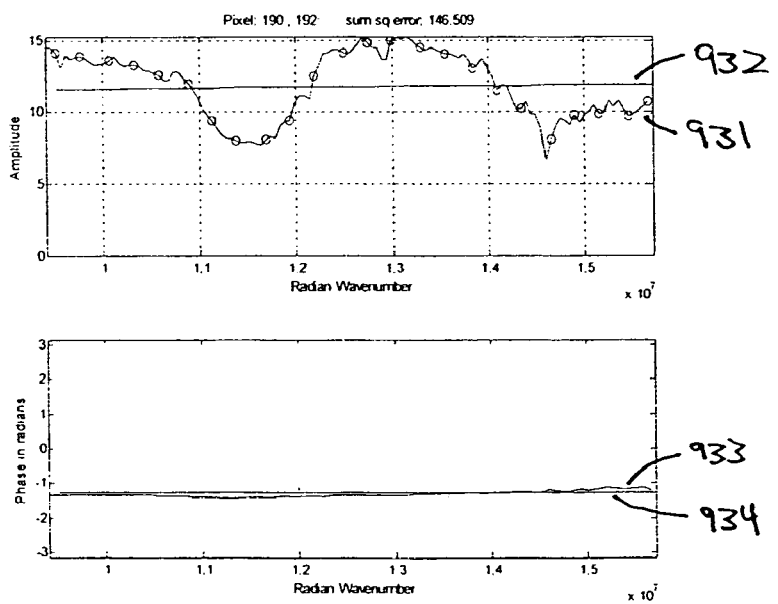

In FIG. 9C for index location (185,182), the estimated intensity amplitude 921 tracks reasonably well with the true intensity amplitude 922 over the wavenumber range, except at the outer limits of the wavenumber range. Similarly, the estimated phase 923 tracks well with the true phase 924 over the wavenumber range, except at the high end of the wavenumber range. FIG. 9D is for index location (185,182) which is very near the spatial frequency origin for this simulation. As seen in FIG. 9D, the estimated intensity amplitude 931 does not track (except on average) the true intensity amplitude 932 over the wavenumber range, and it should be noted that true intensity amplitude 932 is a constant amplitude over the wavenumber range. However, the estimated phase 933 tracks reasonably well with the true phase 934 over the wavenumber range. Accordingly, it can be seen that the simulation discussed above reasonably reconstructs the multispectral image of the image source, except with some bias very near the spatial frequency origin.

Figure 10:
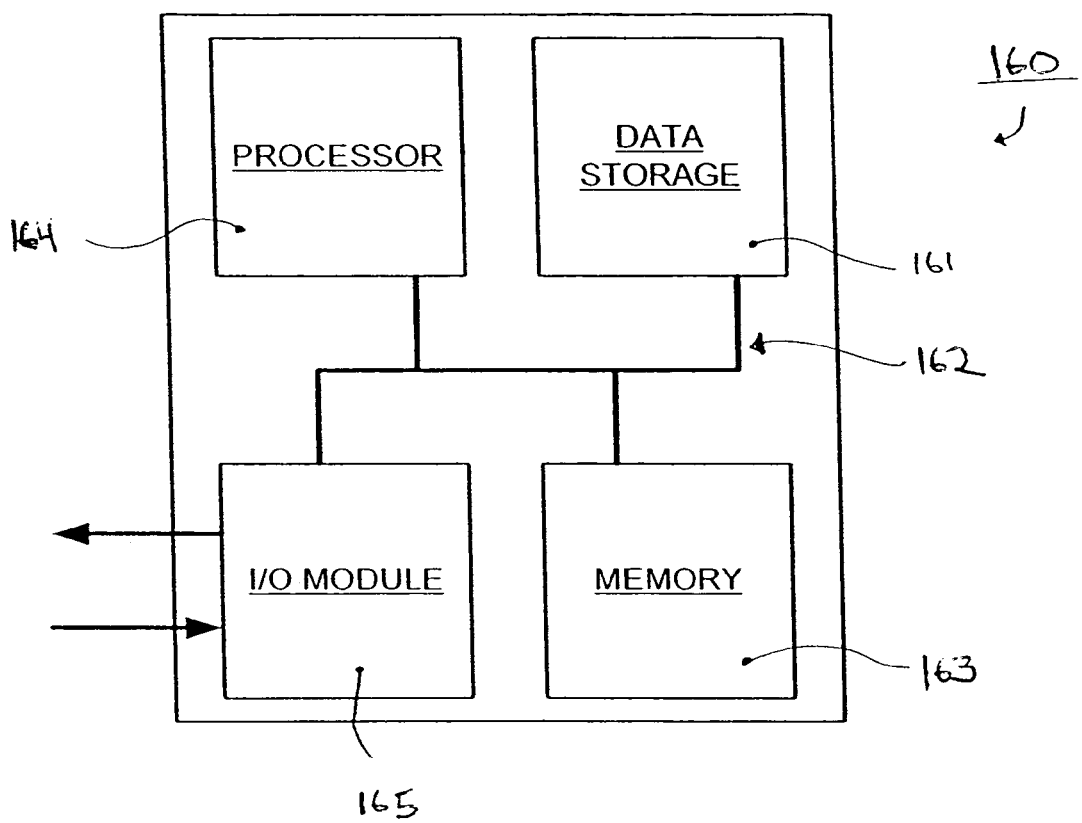
FIG. 10 is a block diagram depicting a computer system with which the present invention may be implemented according to one embodiment of the present invention.

FIG. 10 is a block diagram depicting a computer system with which the present invention may be implemented according to one embodiment of the present invention. As seen in FIG. 10, computer system 160 is provided, with which the present invention may be implemented, according to one embodiment. Computer system 160 includes a bus 162 or other communication mechanism for communicating information between components of computer system 160, and a processor 164, coupled with bus 162, for processing information. Computer system 160 also includes a memory 163, such as a random access memory ("RAM") or other dynamic storage device, coupled to bus 162 for storing information and instructions to be executed by processor 164. Memory 163 may also be used for storing temporary variable or other intermediate information during execution of instructions to be executed by processor 164. Computer system 160 further includes a data storage device 161, such as a magnetic disk or optical disk, coupled to bus 162 for storing information and computer executable steps and/or instructions.

Computer system 160 may be coupled via I/O module 165 to a display device (not illustrated), such as a cathode ray tube ("CRT") or liquid crystal display ("LCD") for displaying information to a computer user. In addition, an input device, such as, for example, a keyboard and a mouse may be coupled to computer system 160 via I/O module 165 for communicating information and command selections to processor 164.

According to one embodiment of the invention, a multi-spectral, or hyperspectral, image is generated by computer system 160 in response to processor 164 executing one or more sequences of one or more computer-executable steps and instructions contained in memory 163. Such instructions may be read into memory 163 from another computer-readable medium, such as data storage device 161. Execution of the sequences of instructions contained in main memory 163 causes processor 164 to perform the process steps described herein. Of course, processor 164 can be comprised of multiple processors in a multi-processing arrangement to execute the sequences of instructions contained in memory 163. In alternative embodiments, hard-wired circuitry may be used in place of, or in combination with, software instructions to implement the invention. Thus, embodiments of the invention are not limited to any specific combination of hardware circuitry and software.

The term "computer-readable medium" as used herein refers to any medium that participates in providing instructions to processor 164 for execution. Such a medium may take many forms, including, but not limited to, non-volatile media, volatile media, and transmission media. Non-volatile media include, for example, optical or magnetic disks, such as data storage device 161. Volatile media include dynamic memory, such as memory 163. Transmission media include coaxial cables, copper wire, and fiber optics, including the wires that comprise bus 162. Transmission media can also take the form of acoustic or light waves, such as those generated during radio frequency and infrared data communications. Common forms of computer-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

In this manner, the estimate of the hyperspectral image is achieved computationally, thereby making use of sparse aperture systems already in place without the need to add additional hardware. Accordingly, the computational hyperspectral imaging capability of the present invention can be added at low additional cost, such as on an orbital imaging platform with an adjustable segmented aperture optical system. As such, the present invention avoids optical filters, splitters, prisms or interleaved sensors with different frequency responses, and makes use of sparse aperture systems, which are advantageous for the reasons described above.

While the present invention has been particularly described above with reference to the various figures and embodiments, it should be understood that the invention is not limited to the above-described embodiments. Various changes and modifications may be made to the invention by those of ordinary skill in the art without departing from the spirit and scope of the invention.

What is claimed is:

1. A computer readable medium comprising computer-executable steps for generating a multispectral or source using an optical system having an adjustable, wavenumber-dependent point spread function, the computer-executable process steps including:

collecting a plurality of panchromatic images of the image source from the optical system, each panchromatic image corresponding to a selected one of a predetermined set of point spread functions and being comprised of a measured intensity data set corresponding to a range of wavelengths;

transforming the collected plurality of panchromatic images from an image domain into a spatial frequency domain by using a Fourier transform;

solving a matrix equation at each one of a predetermined set of spatial frequencies, in which a vector of the transformed panchromatic images is equal to the product of a predetermined matrix of discrete weighting coefficients and a vector representing a wavenumber content of the image source at each spatial frequency, resulting in a determined wavenumber content of the image source in the spatial frequency domain; and inverse transforming the determined wavenumber content of the image source from the spatial frequency domain into the image domain, resulting in the multispectral or hyperspectral image of the image source.

2. A computer readable medium of claim 1, wherein the optical system is a multi-telescope array comprised of an array of telescope subapertures, each telescope subaperture having an independently-adjustable optical path length, and the adjustable, wavenumber-dependent point spread function is adjusted by changing the optical path length of at least one of the telescope subapertures.

3. A computer readable medium of claim 2, wherein the adjustable, wavenumber-dependent point spread function is adjusted by changing the optical path length of each one of the telescope subapertures.

4. A computer readable medium of claim 1, wherein the optical system includes a controlled deformable mirror that is comprised of a plurality of mirror segments, each segment being controlled to have an independently-adjustable optical path length, and the adjustable, wavenumber-dependent point spread function is adjusted by changing the optical path length of at least one of the mirror segment.

5. A computer readable medium of claim 4, wherein the adjustable, wavenumber-dependent point spread function is adjusted by changing the optical path length of each one of the mirror segments.

6. A computer readable medium of claim 1, wherein, in the solution step, the determined wavenumber content of the image source is represented at a discrete set of wavelengths which corresponds to a plurality of contiguous wavelength bands over a range of wavelengths of 400 to 2400 nm, and each wavelength band has an average wavelength spacing of 10 nm.

7. A computer readable medium of claim 1, wherein, in the transforming step, the spatial transform of each panchromatic image is a spatial discrete Fourier transform (DFT) and wherein, in the solving step, for each spatial frequency, the matrix equation is represented by:

$$\check{I}_n = W_n \tilde{s}_n$$

where $\check{I}_n$ is the vector of the transformed panchromatic images which is comprised of a spatial discrete Fourier transform (DFT) of the measured intensity data set for each of the collected plurality of panchromatic images, $W_n$ is the predetermined matrix of discrete weighting coefficients each of which corresponds to a wavelength and a panchromatic image, and $\tilde{s}_n$ is the vector representing a wavenumber content of the image source at each spatial frequency, and the matrix equation is solved to determine $\tilde{s}_n$.

8. A computer readable medium of claim 1, wherein the predetermined matrix of discrete weighting coefficients is calculated based on the predetermined set of point spread functions used during collection of the plurality of panchromatic images in the collecting step.

9. A computer readable medium of claim 1, wherein, in the inverse transforming step, the determined wavenumber content of the image source is inverse spatial discrete Fourier transformed from the spatial frequency domain into the image domain.

10. A computer readable medium of claim 1, wherein the matrix equation is solved for the determined wavenumber content of the image source by using a pseudo-inverse of the matrix equation.

11. A computer readable medium of claim 10, wherein the matrix equation is solved for the determined wavenumber content of the image source by using an iterative solution technique.

12. A computer readable medium of claim 7, wherein an oscillation at one or more edge portions of the determined multispectral or hyperspectral image is reduced by subtracting the mean of the vector of the transformed panchromatic images, $\check{I}_n$, in the matrix equation according to:

$$(\check{I}_n - \text{mean}(\check{I}_n)) = W_n \tilde{s}_n.$$

13. A computational imaging spectroscopy system, comprising:

an optical system for collecting portions of a wavefront from an image source, the optical system having an adjustable, wavenumber-dependent point spread function;

combiner optics for combining and interfering the collected portions of the wavefront on an image plane for collection by at least one panchromatic light intensity sensor;

one or more processors; and a computer readable medium carrying one or more sequences of instructions for computationally generating a multispectral or hyperspectral image of the image source, wherein execution of the one or more sequences of instructions by the one or more processors causes the one or more processors to perform the steps of:

collecting a plurality of panchromatic images of the image source from the optical system, each panchromatic image corresponding to a selected one of a predetermined set of point spread functions and being comprised of a measured intensity data set corresponding to a range of wavelengths;

transforming the collected plurality of panchromatic images from an image domain into a spatial frequency domain by using a Fourier transform;

solving a matrix equation at each one of a predetermined set of spatial frequencies, in which a vector of the transformed panchromatic images is equal to the product of a predetermined matrix of discrete weighting coefficients and a vector representing a wavenumber content of the image source at each spatial frequency, resulting in a determined wavenumber content of the image source in the spatial frequency domain; and inverse transforming the determined wavenumber content of the image source from the spatial frequency domain into the image domain, resulting in the multispectral or hyperspectral image of the image source.

14. The system of claim 13, wherein the optical system is a multi-telescope array comprised of an array of telescope subapertures, each telescope subaperture having an independently-adjustable optical path length, and the adjustable, wavenumber-dependent point spread function is adjusted by changing the optical path length of at least one of the telescope subapertures.

15. The system of claim 14, wherein the adjustable, wavenumber-dependent point spread function is adjusted by changing the optical path length of each one of the telescope subapertures.

16. The system of claim 13, wherein the optical system includes a controlled deformable mirror that is comprised of a plurality of mirror segments, each segment being controlled to have an independently-adjustable optical path length, and the adjustable, wavenumber-dependent point spread function is adjusted by changing the optical path length of at least one of the mirror segment.

17. The system of claim 16, wherein the adjustable, wavenumber-dependent point spread function is adjusted by changing the optical path length of each one of the mirror segments.

18. The system of claim 13, wherein, in the solution step, the determined wavenumber content of the image source is represented at a discrete set of wavelengths which corresponds to a plurality of contiguous wavelength bands over a range of wavelengths of 400 to 2400 nm, and each wavelength band has an average wavelength spacing of 10 nm.

19. The system of claim 13, wherein, in the transforming step, the spatial transform of each panchromatic image is a spatial discrete Fourier transform (DFT) and wherein, in the solving step, for each spatial frequency, the matrix equation is represented by:

$$\check{I}_n = W_n \tilde{S}_n$$

where $\check{I}_n$ is the vector of the transformed panchromatic images which is comprised of a spatial discrete Fourier transform (DFT) of the measured intensity data set for each of the collected plurality of panchromatic images, $W_n$ is the predetermined matrix of discrete weighting coefficients each of which corresponds to a wavelength and a panchromatic image, and $\tilde{s}_n$ is the vector representing a wavenumber content of the image source at each spatial frequency, and the matrix equation is solved to determine $\tilde{s}_n$.

20. The system of claim 13, wherein the predetermined matrix of discrete weighting coefficients is calculated based on the predetermined set of point spread functions used during collection of the plurality of panchromatic images in the collecting step.

21. The system of claim 13, wherein, in the inverse transforming step, the determined wavenumber content of the image source is inverse spatial discrete Fourier transformed from the spatial frequency domain into the image domain.

22. The system of claim 13, wherein the matrix equation is solved for the determined wavenumber content of the image source by using a pseudo-inverse of the matrix equation.

23. The system of claim 22, wherein the matrix equation is solved for the determined wavenumber content of the image source by using an iterative solution technique.

24. The system of claim 19, wherein an oscillation at one or more edge portions of the determined multispectral or hyperspectral image is reduced by subtracting the mean of the vector of the transformed panchromatic images, $\check{I}_n$, in the matrix equation according to:

$$(\check{I}_n - \text{mean}(\check{I}_n)) = W_n \tilde{S}_n.$$

* * * * *

UNITED STATES PATENT AND TRADEMARK OFFICE
CERTIFICATE OF CORRECTION

PATENT NO. : 7,385,705 B1 Page 1 of 1
APPLICATION NO. : 11/445224
DATED : June 10, 2008
INVENTOR(S) : Ralph Thomas Hoctor et al.

It is certified that error appears in the above-identified patent and that said Letters Patent is hereby corrected as shown below:

Column 7, equation (2), the first occurrence of "-jk" should read -- $-j\underline{k}_z$ --.

Column 10, equation (1), "$I_q$" should read -- $\tilde{I}_q$ --.

Column 13, equation (21), "$[\tilde{S}_n]$" should read -- $[\hat{\tilde{S}}_n]$ --.

Column 15, equation (27), "$\tilde{S}$" should read -- $\hat{\tilde{S}}$ --.

IN THE CLAIMS:

Column 18, line 32, before "source", please insert --hyperspectral image of an image--.

Signed and Sealed this

Eighteenth Day of November, 2008

JON W. DUDAS
*Director of the United States Patent and Trademark Office*